United States Patent
Sarwat et al.

(10) Patent No.: US 12,370,912 B1
(45) Date of Patent: Jul. 29, 2025

(54) SYSTEMS AND METHODS FOR DETECTING VEHICLE POSITION DURING DYNAMIC WIRELESS CHARGING

(71) Applicants: Arif I. Sarwat, Miami, FL (US); Milad Behnamfar, Miami, FL (US); Mohd Tariq, Miami, FL (US)

(72) Inventors: Arif I. Sarwat, Miami, FL (US); Milad Behnamfar, Miami, FL (US); Mohd Tariq, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/089,649

(22) Filed: Mar. 25, 2025

(51) Int. Cl.
  *B60L 53/126* (2019.01)
  *G06N 20/20* (2019.01)

(52) U.S. Cl.
  CPC ............ *B60L 53/126* (2019.02); *G06N 20/20* (2019.01); *B60L 2240/12* (2013.01); *B60L 2240/62* (2013.01)

(58) Field of Classification Search
  None
  See application file for complete search history.

(56) References Cited

U.S. PATENT DOCUMENTS

| | | | |
|---|---|---|---|
| 2018/0178666 A1* | 6/2018 | Javaid | H02J 50/90 |
| 2019/0097471 A1* | 3/2019 | Pantic | H02J 50/12 |

* cited by examiner

*Primary Examiner* — David V Henze-Gongola
(74) *Attorney, Agent, or Firm* — SALIWANCHIK, LLOYD & EISENSCHENK

(57) ABSTRACT

Systems and methods are provided for detecting vehicle position during electric vehicle charging using machine learning, as well as a control scheme for activating charging coils when the vehicle crosses them. The machine learning can have as inputs the primary current, the vehicle ground clearances, and the speed of the vehicle. As different vehicles with different ground clearances are traveling across the transmitter coils for charging, ground clearance can be defined as a variable for machine learning. Vehicles can move at different speeds, so the speed of the vehicle can be considered in the prediction of the vehicle position.

20 Claims, 20 Drawing Sheets

| Parameter | Description | Value |
|---|---|---|
| $l_{AL}$ | Aluminum plate length | 410 mm |
| $w_{AL}$ | Aluminum plate width | 410 mm |
| $l_{fe}$ | Ferrite plate length | 370 mm |
| $w_{fe}$ | Ferrite plate width | 370 mm |
| $w_c$ | Coil width | 25 mm |
| $l_{in,coil}$ | Inner length of coil | 230 mm |
| $l_{overlap}$ | Overlapping length of coils | 185 mm |
| $d_{coil}$ | Distance between adjacent transmitter coils | 50 mm |
| $d$ | Air gap | 150 mm |

FIG. 18

| Parameter | Values |
|---|---|
| Air gap (d) | [150 mm, 160 mm, 170 mm, 180 mm, 190 mm, 200 mm] |
| Speed (V) | [40 km/h, 50 km/h, 60 km/h, 70 km/h, 80 km/h] |
| Position (y) | [0, 100 mm, 200 mm, 300 mm, 400 mm, ..., 1800 mm] |

FIG. 19

| Parameter | Description | Value |
|---|---|---|
| $V_{in}$ | Input voltage | 200 V |
| $L_{p1}, L_{p2}, L_{p3}$ | Self-inductance of transmitter coils | 50 µH |
| $C_{p1}, C_{p2}, C_{p3}$ | Primary series resonant capacitors | 70 nF |
| $L_2$ | Self-inductance of receiver coil | 50 µH |
| $C_s$ | Secondary resonant capacitor | 70 nF |
| $C_{B1}$ | Input capacitor of buck converter | 100 µF |
| $C_{B2}$ | Output capacitor of buck converter | 75 µF |
| $L_J$ | Inductor of buck converter | 9 mH |
| $f_s$ | Operating frequency of inverter | 85 kHz |
| $f$ | Frequency of buck converter | 20 kHz |
| $R_L$ | Load resistor | 22 Ω |

FIG. 20

SYSTEMS AND METHODS FOR DETECTING VEHICLE POSITION DURING DYNAMIC WIRELESS CHARGING

BACKGROUND

Electric vehicles continue to gain popularity as viable alternatives to traditional fossil fuel-powered counterparts, sparking a strategic transformation within the automotive industry toward embracing electric propulsion. This shift is primarily motivated by growing concerns regarding the depletion of fossil resources and the environmental repercussions associated with conventional fuel-powered vehicles. Despite notable advancements in the design of electric vehicle charging infrastructure, a persistent challenge looms large, which is the prevalence of range anxiety. This enduring issue acts as a formidable barrier, impeding the widespread acceptance of electric vehicles among the general public.

BRIEF SUMMARY

Embodiments of the subject invention provide novel and advantageous systems and methods for detecting vehicle position (during electric vehicle charging) using machine learning (ML), as well as a control scheme for activating charging coils when the vehicle crosses them. The ML can have as inputs the primary current, the vehicle ground clearances, and the speed of the vehicle. As different vehicles with different ground clearances are traveling across the transmitter coils for charging, ground clearance can be defined as a variable for ML. Vehicles can move at different speeds, so the speed of the vehicle can be considered in the prediction of the vehicle position. A control strategy can be used to activate the coils by controlling the switches of each coil based on the vehicle position obtained by ML. Embodiments do not require extra sensors and/or auxiliary coils for detecting the vehicle position, thereby reducing the cost and complexity of the system. Also, the system has a fast response to detect the vehicle position because ML is a good tool to deal with nonlinear time-varying problems, which makes the system excellent at detecting vehicles in dynamic charging where vehicles travel at high speed.

In an embodiment, a system for detecting position of a vehicle during wireless charging can comprise: at least two transmitter coils (e.g., at least five transmitter coils) configured to perform wireless charging with a receiver coil; at least one first sensor configured to sense a ground clearance of the vehicle during wireless charging; at least one second sensor configured to sense a speed of the vehicle during wireless charging; and a controller in operable communication with the at least two transmitter coils, the at least one first sensor, and the at least one second sensor. The controller can be configured to perform the following steps during wireless charging: i) receive, from the at least two transmitter coils during wireless charging, a primary current of the at least two transmitter coils; ii) receive, from the at least one first sensor during wireless charging, a measurement of the ground clearance of the vehicle; iii) receive, from the at least one second sensor during wireless charging, a measurement of the speed of the vehicle; iv) utilize a ML algorithm to determine a position of the vehicle in real time based on the primary current of the at least two transmitter coils, the ground clearance of the vehicle, and the speed of the vehicle; and v) implement a control strategy to control the at least two transmitter coils based on the position of the vehicle. The control strategy can comprise controlling respective switches of the at least two transmitter coils to ensure a transmitter coil of the at least two transmitter coils that is closest to the receiver coil is activated and all other transmitter coils of the at least two transmitter coils are deactivated. The controller can be configured to further perform the following step during wireless charging: vi) repeat steps i)-v) until the controller determines that the receiver coil is no longer within range to be wirelessly charged by any transmitter coil of the at least two transmitter coils. The ML algorithm may use only the primary current of the at least two transmitter coils, the ground clearance of the vehicle, and the speed of the vehicle as inputs, and can generate the position of the vehicle as output. The ML algorithm can be, for example, random forest, decision tree, gradient boosting, K-nearest neighbor (KNN), support vector regression (SVR), neural network, Bayesian ridge, or linear regression. Preferably, the ML algorithm can be decision tree or, more preferably random forest. The at least two transmitter coils can be directly connected to at least two compensation networks, respectively, and the at least two compensation networks can be directly connected to at least two inverters, respectively (see also FIG. 1).

In another embodiment, a method for detecting position of a vehicle during wireless charging can comprise: i) providing at least two transmitter coils configured to perform wireless charging with a receiver coil, at least one first sensor configured to sense a ground clearance of the vehicle during wireless charging, and at least one second sensor configured to sense a speed of the vehicle during wireless charging; ii) performing wireless charging of the vehicle using the at least two transmitter coils; iii) receiving, by a controller, from the at least two transmitter coils during wireless charging, a primary current of the at least two transmitter coils; iv) receiving, by the controller, from the at least one first sensor during wireless charging, a measurement of the ground clearance of the vehicle; v) receiving, by the controller, from the at least one second sensor during wireless charging, a measurement of the speed of the vehicle; vi) utilizing, by the controller, a ML algorithm to determine a position of the vehicle in real time based on the primary current of the at least two transmitter coils, the ground clearance of the vehicle, and the speed of the vehicle; and vii) implementing, by the controller, a control strategy to control the at least two transmitter coils based on the position of the vehicle. The control strategy can comprise controlling respective switches of the at least two transmitter coils to ensure a transmitter coil of the at least two transmitter coils that is closest to the receiver coil is activated and all other transmitter coils of the at least two transmitter coils are deactivated. The method can further comprise viii) repeating steps iii)-vii), by the controller, until the controller determines that the receiver coil is no longer within range to be wirelessly charged by any transmitter coil of the at least two transmitter coils. The ML algorithm using only the primary current of the at least two transmitter coils, the ground clearance of the vehicle, and the speed of the vehicle as inputs, and generating the position of the vehicle as output. The ML algorithm may use only the primary current of the at least two transmitter coils, the ground clearance of the vehicle, and the speed of the vehicle as inputs, and can generate the position of the vehicle as output. The ML algorithm can be, for example, random forest, decision tree, gradient boosting, KNN, SVR, neural network, Bayesian ridge, or linear regression. Preferably, the ML algorithm can be decision tree or, more preferably random forest. The at least two transmitter coils can be directly connected to at least two compensation networks, respectively, and the at least two compensation networks can be directly connected to at least two inverters, respectively (see also FIG. 1).

BRIEF DESCRIPTION OF DRAWINGS

FIG. 18 shows a table of transmitter and receiver coupler dimensions.

FIG. 19 shows a table of a database for ML parameters.

FIG. 20 shows a table of circuit parameters.

DETAILED DESCRIPTION

Embodiments of the subject invention provide novel and advantageous systems and methods for detecting vehicle position (during electric vehicle charging) using machine learning (ML), as well as a control scheme for activating charging coils when the vehicle crosses them. The ML can have as inputs the primary current, the vehicle ground clearances, and the speed of the vehicle. As different vehicles with different ground clearances are traveling across the transmitter coils for charging, ground clearance can be defined as a variable for ML. Vehicles can move at different speeds, so the speed of the vehicle can be considered in the prediction of the vehicle position. A control strategy can be used to activate the coils by controlling the switches of each coil based on the vehicle position obtained by ML. Embodiments do not require extra sensors and/or auxiliary coils for detecting the vehicle position, thereby reducing the cost and complexity of the system. Also, the system has a fast response to detect the vehicle position because ML is a good tool to deal with nonlinear time-varying problems, which makes the system excellent at detecting vehicles in dynamic charging where vehicles travel at high speed.

Figure 1:
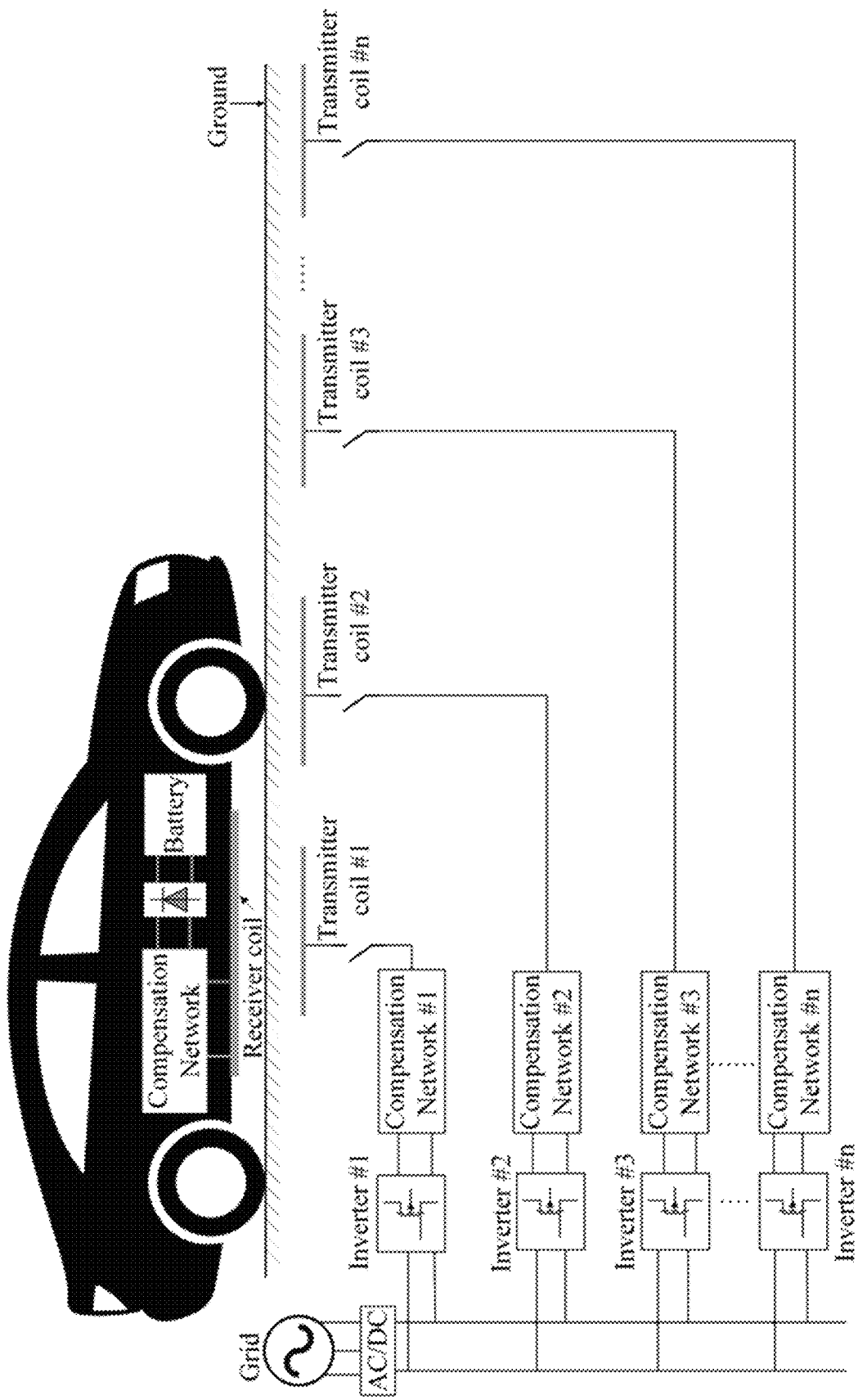
FIG. 1 shows a schematic view of a system for detecting vehicle position during charging of an electric vehicle, according to an embodiment of the subject invention.
Figure 2:
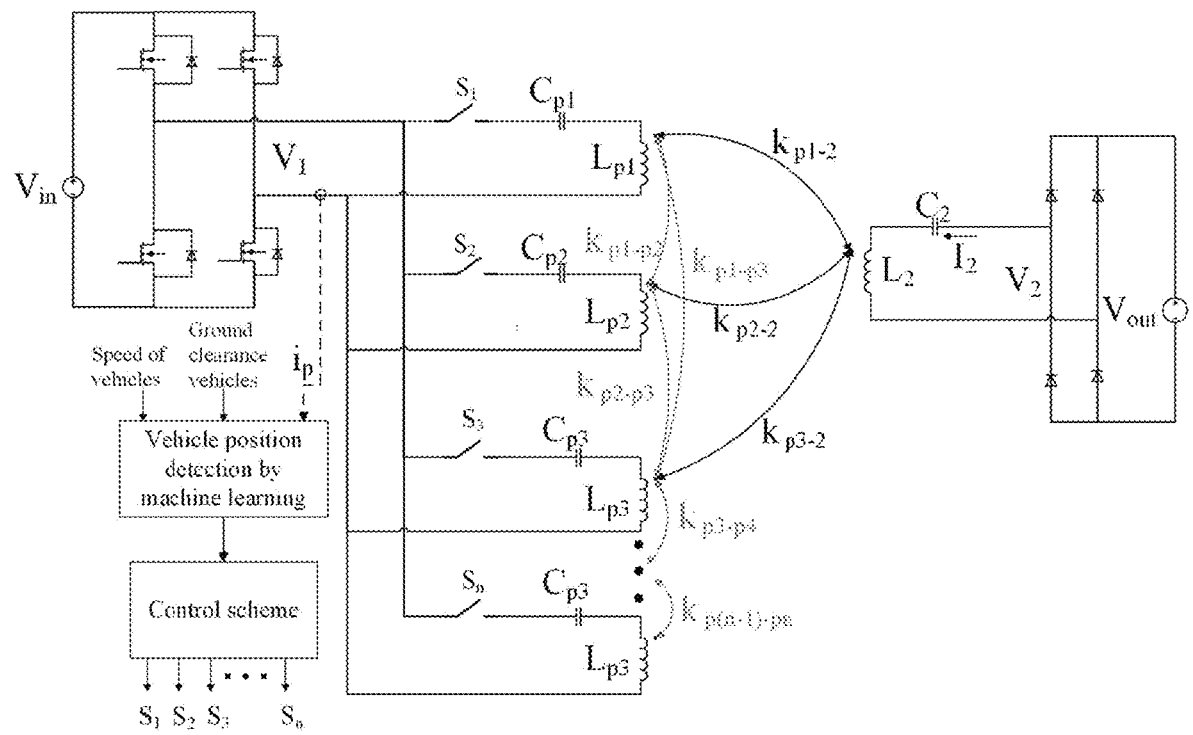
FIG. 2 shows the circuit topology of a system (e.g., the system shown in FIG. 1) for detecting vehicle position during charging of an electric vehicle, according to an embodiment of the subject invention.
Figure 3:
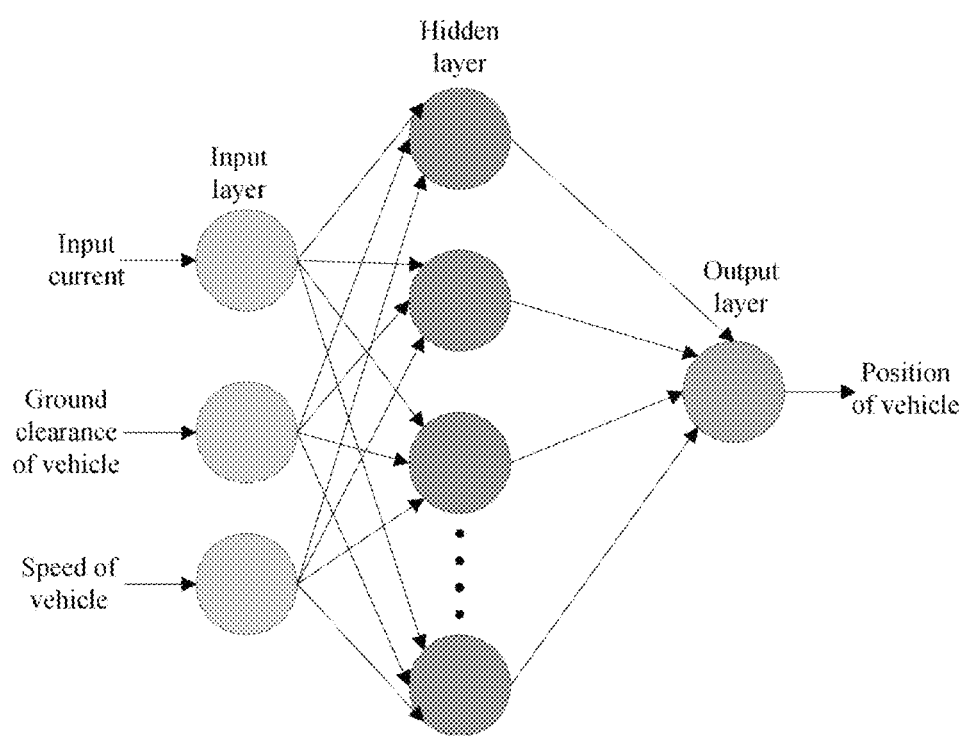
FIG. 3 shows a schematic view of machine learning (ML) that can be used with a system (e.g., the system shown in FIG. 1) for detecting vehicle position during charging of an electric vehicle, according to an embodiment of the subject invention.

FIG. 1 shows the structure of a system for detecting vehicle position, and FIG. 2 shows the circuit topology of the system. Referring to FIGS. 1 and 2, the system can comprise an inverter to produce high-frequency current to supply the transmitter coil. A compensation network can be used between the inverter and the transmitter coil to reduce the reactive power, provide soft switching, and improve efficiency. Multiple inductive coils (e.g., of the same size as the receiver coil) can be deployed at the transmitter side to form a track for transferring power to the receiver coil continuously as the receiver travels across transmitter coils. The receiver coil can be connected to a compensation network to reduce the reactive power. The compensation network can be connected to a rectifier to convert the alternating current (AC) voltage to direct current (DC) voltage to supply the battery. A controller (e.g., a field programmable gate array (FPGA) controller) can be used to implement the ML, and each transmitter coil can be connected to a switch to be energized and/or de-energized based on the vehicle detection algorithm. A current sensor can be used to measure the primary current, which can be one of the inputs (e.g., one of the three inputs) of the ML. Two other inputs of the ML can be the ground clearance of electric vehicles and the speed of the vehicle. FIG. 3 shows the ML model with three inputs (input current, ground clearance of vehicles, and the speed of vehicles), with the output of the ML being the position of the vehicle(s). The system can be used in dynamic charging of electric vehicles, which enables electric vehicles to be charged while in motion.

Concern over the range of electric vehicles acts as a barrier to the widespread acceptance of electric vehicles among the general public. In response to this, dynamic wireless charging (DWC) can be used to alleviate some of the concern by addressing range anxiety and the necessity for larger battery capacities in mobile electric vehicles.

DWC can help ensure a reliable and uninterrupted charging experience for electric vehicles in motion. As electric vehicles continue to gain traction as a sustainable mode of transportation, the significance of DWC becomes increasingly evident in mitigating challenges and fostering the widespread acceptance of these innovative vehicles.

With respect to DWC, a pivotal distinction arises based on the length of the transmitter's coil, leading to the categorization of two primary types: the long-track transmitter; and the segmented coil array. The long-track transmitter, as the name suggests, implements an extended transmitter track, enabling the simultaneous charging of multiple vehicles over considerable distances. This design, while promising in facilitating long-distance charging scenarios, comes with inherent drawbacks. Notably, it grapples with challenges such as reduced efficiency and heightened electromagnetic interference. The extended track introduces complexities that impact the overall performance of this charging method. In contrast, the segmented coil array takes a more intricate approach to overcome the limitations associated with the long-track transmitter. This alternative strategy involves the use of multiple transmitter coils, each precisely sized to match the receiver. As the receiver advances along the transmitter track, these coils are activated selectively. This thoughtful activation ensures a targeted and efficient energy transfer, effectively mitigating the efficiency and electromagnetic interference issues encountered with the long-track transmitter design.

In the segmented coil array, as the receiver pad travels along the transmitter track, it selectively picks up energy only from the transmitters that are coupled with it. Nonetheless, the high-frequency current in each uncoupled transmitter coil may not only induce increased losses and decreased efficiency but also generate problems with electromagnetic interference (EMI). Consequently, it is essential to turn off the uncoupled transmitters, as these inactive transmitter coils are not transferring power to the receiver pad. This control mechanism is referred to as segmentation control. Segmentation control necessitates knowledge of the vehicle's position to appropriately turn on and off each transmitter coil. Accurate positioning detection is essential to ensure efficient power transfer and precise manipulation of the electromagnetic field. Methods of receiver position identification can include utilizing additional sensors, deploying extra coils for detection, and leveraging circuit parameters of transmitter coils.

Related art methods for locating and detecting the receiver involve the use of optical, ultrasonic, and magnetic sensors. While coil positioning can be achieved using radio frequency (RF) detection and/or optical/ultrasound sensors, their effectiveness may be impacted by the magnetic field of the DWC system, necessitating the use of extra hardware. However, sensors are significantly affected by environmental factors, such as rain, shadows, and/or dirt, leading to inaccurate judgments, especially in rapid switching processes among multiple charging units. Moreover, the inclusion of additional magnetic sensors in these methods results in an elevated cost for the DWC system, and the installation of these sensors adds complexity to the overall DWC system.

Another strategy for detecting the vehicle's position is the deployment of auxiliary coils. Auxiliary detection coils can be deployed on the primary side or the secondary side of the DWC system to detect the position by identifying changes in magnetic flux. Several additional coils can be deployed to determine the position of electric vehicles. In order to enhance the accuracy of receiver position detection, additional detection coils can be strategically placed on both the primary and secondary sides of the DWC system. The configuration of this system can include an extra coil for sensing and an identification circuit. The detection circuit can transform the induced voltage from the sensor coil into a signal that the main controller can interpret. However, incorporating additional detection coils presents a challenge, as it causes an increase in the volume and cost of the DWC system. Further, such methods can be constrained to detecting the receiver's position in a single direction rather than across a full plane.

Another approach for identifying the vehicle's position involves leveraging the circuit parameters of the transmitter coils. This method can eliminate the need for additional sensors or coils for detection. Related art methods entail the need for multiple current samplings, and determining the receiver (RX) position relies on the comparison of current values, resulting in a relatively slow response speed.

ML stands out as a highly effective methodology for the prediction and detection of vehicle positions, primarily owing to its inherent self-learning capabilities, adaptability to diverse environments, and rapid response mechanisms. The related art lacks consideration of the influence of speed on predicting a vehicle's position. Further, there is a noticeable gap in employing a diverse set of ML algorithms for vehicle detection. Embodiments of the subject invention can employ various ML algorithms for vehicle position detection and can compare results in terms of accuracy and minimum error, shedding light on the performance disparities among the utilized algorithms. In order to ensure real-world relevance, different ground clearances of electric vehicles (air gap) can be considered and incorporated, as can various vehicle speeds, contributing to a more representative analysis. Key input features can include transmitter current, $\Delta C$ (change in current), pad number, air gap, and speeds. This holistic approach can capture the multifaceted nature of real-world scenarios and provide insights into the algorithms' adaptability across diverse conditions. The ML algorithms considered include gradient boosting, decision tree, support vector regression (SVR), random forest, neural network, K-nearest neighbor (KNN), and Bayesian ridge, each offering distinct advantages and nuances in addressing the complexities of vehicle position detection.

The methodology employed in embodiments of the subject invention encompasses the strategic utilization of an extensive array consisting of eight distinct ML algorithms. A primary objective is to predict the precise position of the vehicle, and this involves conducting a meticulous and comprehensive comparison of the results obtained using each algorithm. The overarching goal was to discern and isolate the most effective algorithm among the diverse set, thereby enhancing the accuracy and reliability of the predictive model. An additional layer of depth was infused through the deliberate inclusion of critical parameters that wield considerable influence in real-world scenarios. Considerations include the dynamic variability in ground clearances exhibited by different vehicles and the range of speeds at which these vehicles operate. By incorporating these factors, a simulation environment can be created that mirrors the complexities inherent in practical situations, thus fortifying the relevance and applicability of the findings. The results for each algorithm are presented, encompassing detailed regression plots, a thorough analysis of errors specific to each position, and a robust evaluation of the mean squared error. This comprehensive approach can foster a nuanced and thorough understanding of the performance intricacies exhibited by each algorithm. This can move beyond mere numerical outputs, offering a comprehensive insight that helps clarify the strengths and limitations of each algorithm in the specific context of predicting vehicle positions.

Figure 4A:
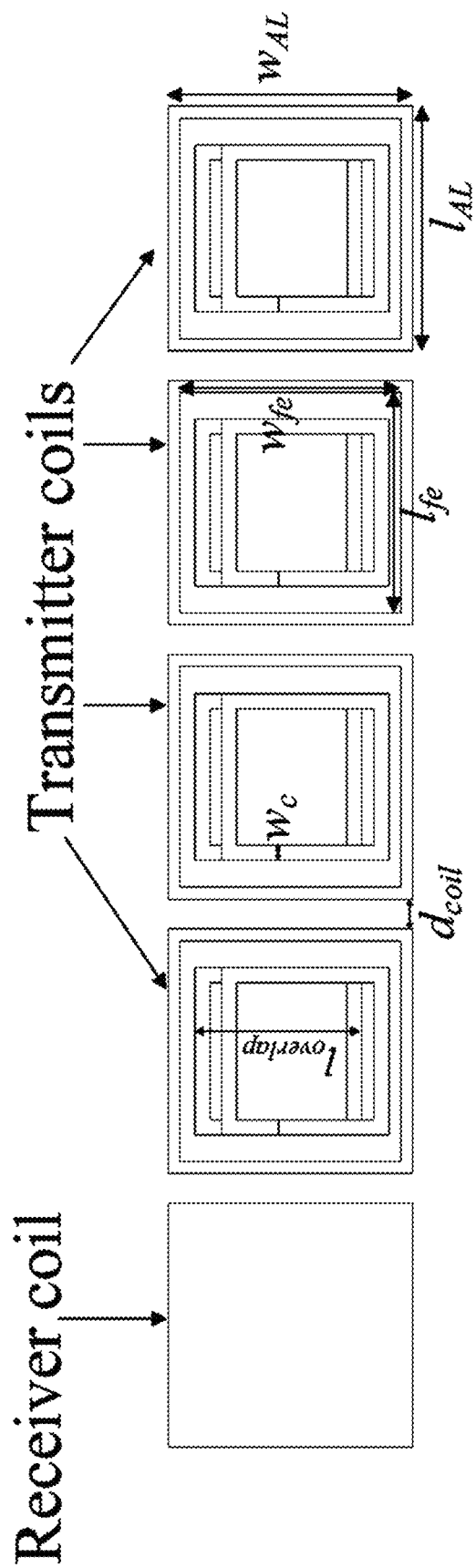
FIG. 4A shows a three-dimensional (3D) view of a coil that can be used with a system (e.g., the system shown in FIG. 1) for detecting vehicle position during charging of an electric vehicle, according to an embodiment of the subject invention.
Figure 4B:
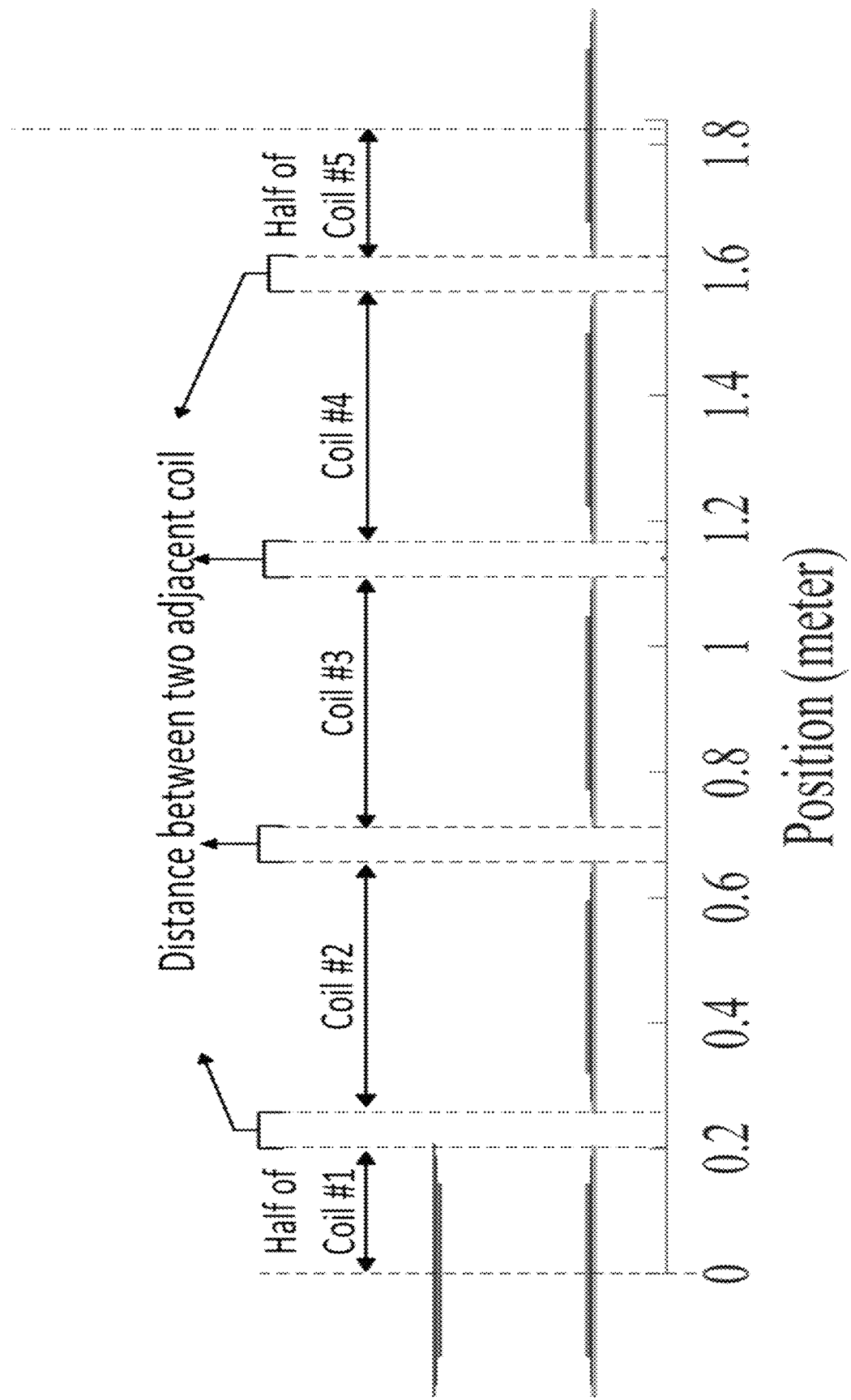
FIG. 4B shows a front view of the coil from FIG. 4A. Though distances between adjacent coils are shown (in meters), this is for exemplary purposes and should not be construed as limiting.

FIGS. 4A (three-dimensional (3D) view) and 4B (front view) show the structure of a segmented coil array that can be employed in a system of embodiments of the subject invention. The transmitter track can include a plurality of (e.g., five) bipolar coils, and each coil can be the same size as the receiver pad. The table in FIG. 18 shows example dimensions of the receiver pad and transmitter coils; these should not be construed as limiting.

When the vehicle aligns with the transmitter coil, the activation of the corresponding transmitter coil becomes essential. Upon the vehicle's departure, the same transmitter coil should be promptly deactivated, ensuring optimal energy consumption. This strategic activation and deactivation process, synchronized with the vehicle's presence, not only conserves energy but also minimizes EMI. By selectively activating transmitter coils only within the coverage range of the receiver coil, the DWC system can achieve significant energy savings. Simultaneously, keeping non-relevant coils inactive contributes to a reduction in EMI, enhancing the overall efficiency and safety of the DWC system. The intricate dance of activation and deactivation can be orchestrated by a sophisticated switching control system, reliant on precise information about the vehicle's position. In essence, this mechanism can ensure a harmonious interplay between the vehicle and the charging infrastructure, optimizing both energy utilization and electromagnetic compatibility.

Figure 5:
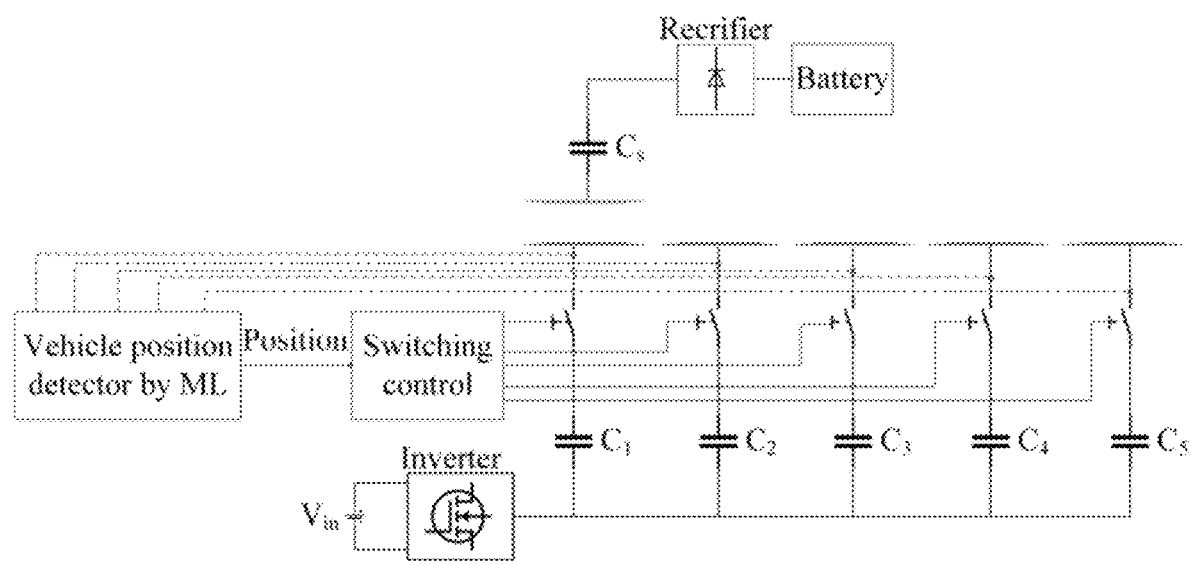
FIG. 5 shows the structure of activating transmitter coils based on ML algorithms, according to an embodiment of the subject invention.

FIG. 5 shows a diagram of the mechanism for activating transmitter coils through the integration of advanced ML algorithms, according to embodiments of the subject invention. In this setup, each transmitter coil can be intricately linked to a dedicated compensation network via individual switches. The orchestration of these switches can fall under the purview of a sophisticated switching control unit. This control unit can operate the switches in alignment with the vehicle's position, a determination facilitated by a robust ML algorithm. A diverse set of ML algorithms was considered to enhance the precision of vehicle position identification, including random forest, decision tree, gradient boosting, SVR, neural network, KNN, and Bayesian ridge. Each algorithm brings its unique capabilities to the forefront, contributing to the comprehensive evaluation of their effectiveness in optimizing transmitter coil activation based on vehicle position.

After accurately determining the vehicle's real-time position and mapping the locations of individual transmitter pads, coil activation can be optimized using a lookup table. This table can serve to activate specific transmitter coils precisely as the vehicle approaches, ensuring an efficient and responsive DWC system.

An extensive discussion follows regarding the different types of ML algorithms considered (random forest, decision tree, gradient boosting, SVR, neural network, KNN, and Bayesian ridge) used for estimating the vehicle's position, considering different air gaps and speeds, and sampling the transmitter current. The relationship between the input and output of the ML algorithms can be formulated as follows:

$$y = f(x) = f(d, V, i_p)$$

where x and y represent the input and output, respectively, with y denoting the position. The input x can include d, V, and $i_p$, representing the air gap, speed, and primary current, respectively. The input x can be written as follows:

$$x = \begin{bmatrix} x_1 \\ x_2 \\ \vdots \\ x_t \end{bmatrix} = \begin{bmatrix} d_1 & V_1 & i_{p1} \\ d_2 & V_2 & i_{p2} \\ \vdots & \vdots & \vdots \\ d_n & V_n & i_{pn} \end{bmatrix}$$

The table in FIG. 19 presents a database for the parameters (air gap, speed, and position) used in the consideration of different ML algorithms. The values in the table in FIG. 19 should not be construed as limiting. A simulation was conducted in ANSYS Maxwell (ANSYS Electronics Desktop 2023) to obtain mutual inductance data for various air gap values, as listed in the table in FIG. 19, corresponding to positions ranging from 0 millimeters (mm) to 1800 mm. Subsequently, MATLAB Simulink was employed to derive primary current data based on the mutual inductance data at different vehicle speed values. Ultimately, a total of 22,200 samples were collected. The sample database was formed as follows:

$$\text{Data} = \{(x_1, y_1), (x_2, y_2) \ldots (x_i, y_i), i = 1, 2, 3 \ldots n\}$$

To significantly enhance the accuracy of obtaining vehicle positions, the emphasis was on creating a variety of ML algorithms for position estimation models. Subsequently, a thorough comparative analysis was conducted to evaluate the precision achieved by these ML algorithms in position estimation.

Random Forest

Figure 6:
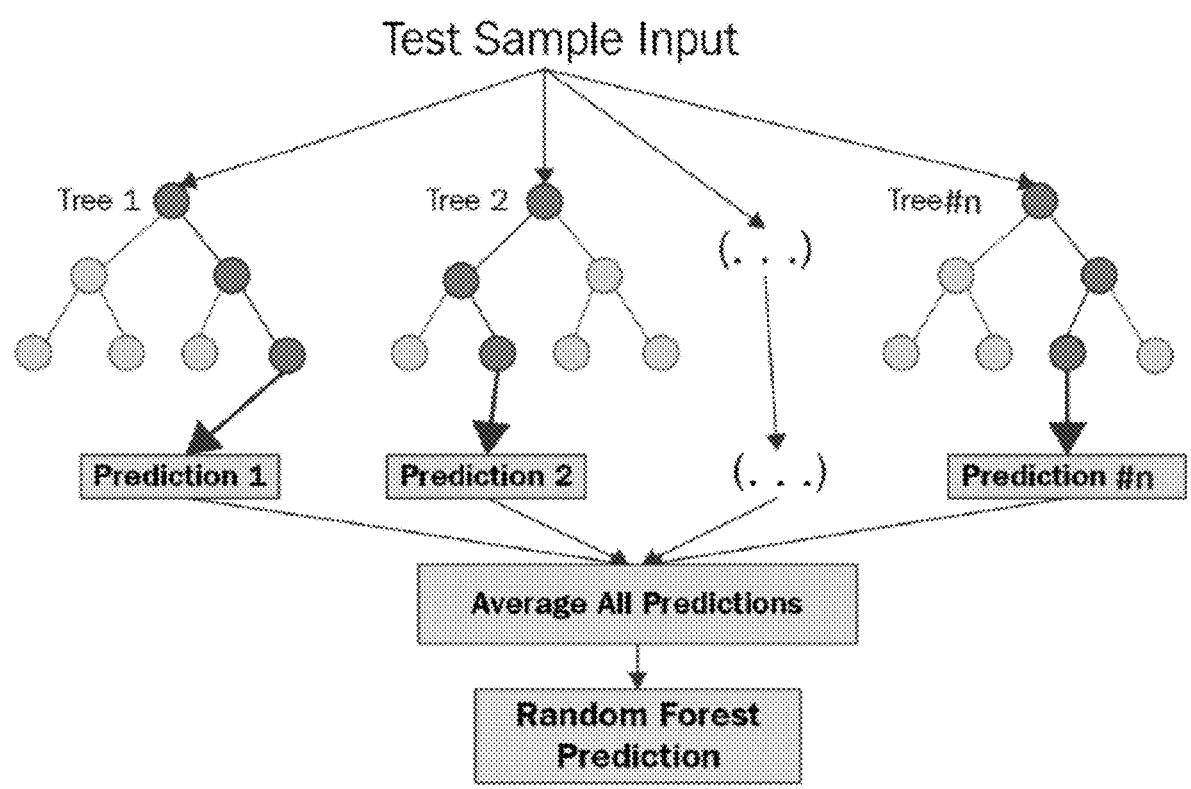
FIG. 6 shows a random forest algorithm structure.

Random forest operates as an ensemble method and is effective in addressing classification challenges. Unlike single decision trees, random forest trains multiple trees within an ensemble. The collective decision of these trees, based on a majority consensus, determines the final class. Random forest boasts several advantages, including speed, scalability, resilience to noise, and resistance to overfitting. It is user-friendly, eliminating the need for intricate parameter management. Additionally, random forest provides ease of interpretation and visualization. FIG. 6 visually represents the structure of the random forest algorithm, showcasing its ensemble-based approach. This methodology ensures versatility and reliability, making the random forest algorithm a robust solution across various classification scenarios.

In the domain of random forests, each tree within the ensemble relies on a set of randomly chosen variables. To formalize this, let $x = (x_1, \ldots, x_p)^T$ denote a p-dimensional random vector representing the real-valued input or predictor variables, and let y be a random variable representing the real-valued response. An unknown joint distribution $P(x, y)$ can be assumed. The main objective is to discover a prediction function $f(x)$ capable of predicting y. Ensemble methods construct this prediction function f using a set of base learners $h_1(x), \ldots, h_J(x)$, and these base learners are combined to create the ensemble predictor $f(x)$. In regression tasks, the base learners are typically averaged.

$$\hat{h}(x) = \overline{y} = \frac{1}{n} \sum_{i=1}^{n} y_{k_i}; \quad \hat{f}(x) = \frac{1}{J} \sum_{j=1}^{J} \hat{h}_j(x)$$

where $\hat{h}_j(x)$ is the prediction of the response variable at x using the jth tree.

Key hyperparameters include the number of trees in the random forest, controlling the maximum depth of each tree to limit the depth, the minimum samples required to split an internal node, and the minimum samples required to be at a leaf node. In the model used, 100 trees were employed with no specified maximum depth, a minimum of two samples were required to split an internal node, and one sample was required to be at a leaf node.

Decision Tree

Figure 7:
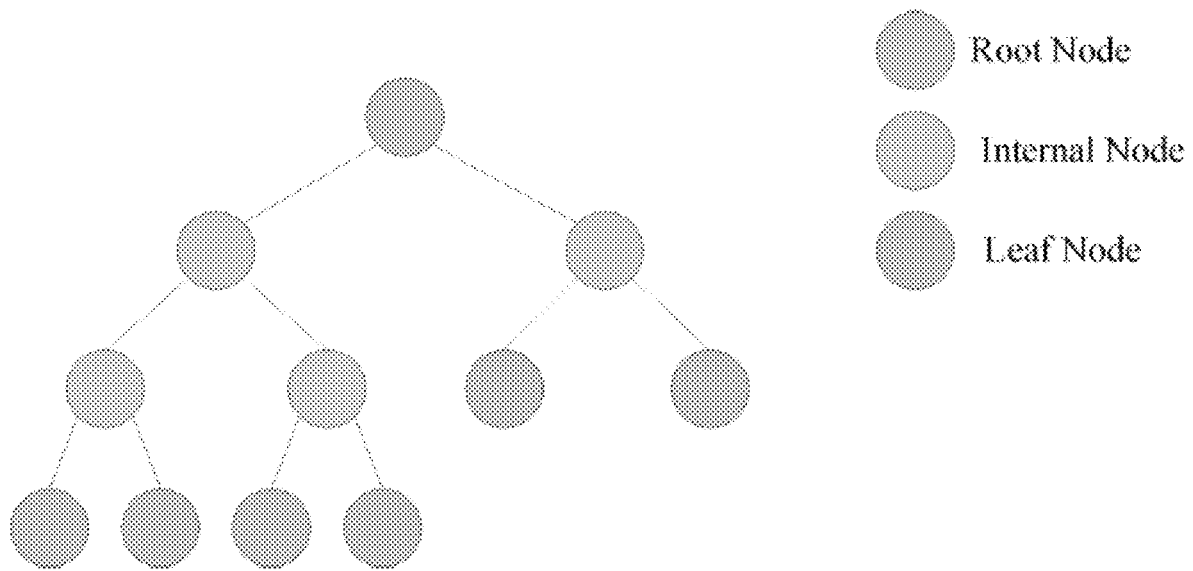
FIG. 7 shows a decision tree algorithm structure.

A decision tree stands out as a supervised ML technique specifically designed to tackle both classification and regression problems through a systematic process of data division based on distinct parameters. The leaves of the tree represent the decision outcomes, whereas the nodes facilitate the segmentation of the data. In the context of a classification tree, the decision variable is categorical, leading to binary outcomes like yes/no. Conversely, in a regression tree, the decision variable is continuous, accommodating numerical predictions. Decision tree has many advantages. Decision tree exhibits versatility in handling diverse scenarios, whether regression or classification, and provides interpretability. The effectiveness extends to managing both categorical and quantitative values, along with the ability to handle missing attribute values through imputation. The tree traversal algorithm ensures high performance, but decision trees face challenges, particularly the risk of overfitting. To overcome this limitation, the random forest technique offers a solution by adopting an ensemble modeling approach. The structure of the decision tree algorithm is visually depicted in FIG. 7, emphasizing its hierarchical and branching nature.

The concept of entropy, quantifying the amount of information required for an accurate description of data, is expressed as follows:

$$\text{Entropy}(S) = -\sum_{i=1}^{C} p_i \log_2(p_i)$$

where S is the training dataset, C is the number of classes, and p is the proportion of S classified as i. The aim of a split in a tree is to decrease the impurity (uncertainty) in the dataset with respect to the class in the next stage. This objective is achieved by calculating the information gain as follows:

$$\text{Gain}(S, a) = \text{Entropy}(S) - \sum_{v \in Values} \frac{|S_v|}{|S|}$$

where $S_v = s \in S : a(s) = V$, with v being the value of the attribute.

Key hyperparameters include the maximum depth of the tree, regulating the maximum depth, the minimum samples required to split an internal node, specifying the minimum number of samples required to split an internal node, and the minimum samples needed to be at a leaf node. In the model used, there was no specified maximum depth, two samples were required to split an internal node, and a minimum of one sample per leaf node was set.

Gradient Boosting

Figure 8:
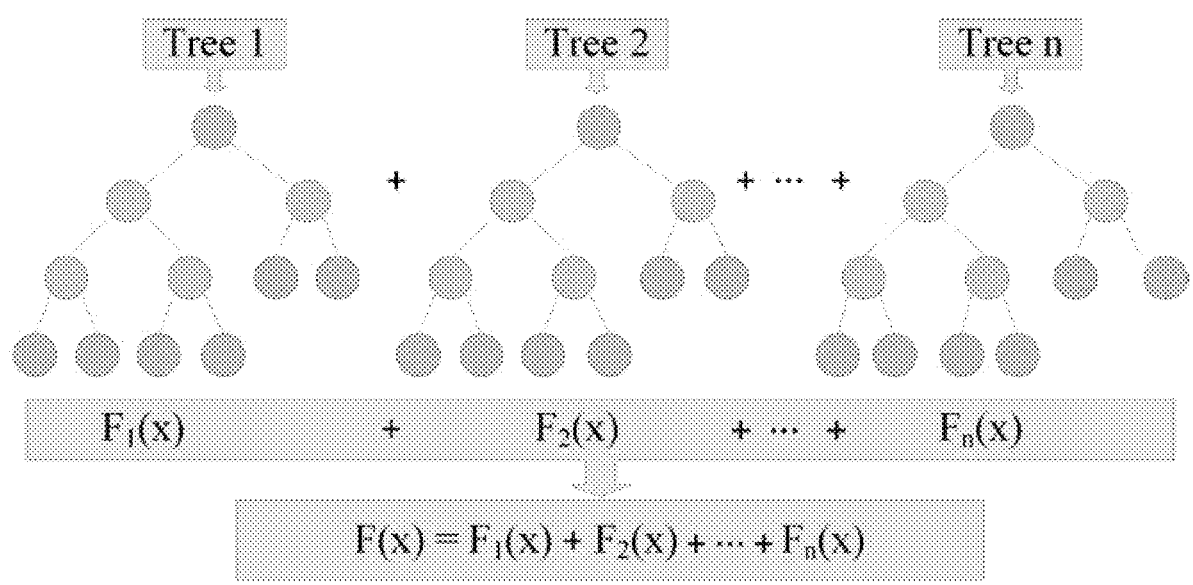
FIG. 8 shows a gradient boosting algorithm structure.

Gradient boosting, a robust algorithm, employs an iterative approach to enhance model performance. It achieves this by fitting a weak learner to the residual errors in each iteration, progressively refining predictions. The strength of gradient boosting lies in its ability to unravel intricate data structures, capture nonlinearity, and detect high-order interactions within the data. This technique proves particularly effective in scenarios featuring a vast number of potential predictors, ranging from hundreds to tens of thousands. As the algorithm iterates, it autonomously refines its understanding of the data, leading to continuous improvements in overall model accuracy. The structural overview of the gradient boosting algorithm is depicted in FIG. 8.

In the context of a training dataset $D=\{(x_i, y_i)\}_{i=1}^{N}$, the primary objective of gradient boosting is to derive an approximation, denoted as $\hat{F}(x)$, for the underlying function $F^*(x)$. This function maps input instances x to their corresponding output values y. The optimization process involves minimizing the expected value of a predefined loss function $L(y, F(x))$. Gradient boosting achieves this by constructing an additive approximation of $F^*(x)$ through a weighted sum of functions. Initially, an initial constant approximation of $F^*(x)$ is acquired as follows:

$$\hat{F}_0(x) = \arg\min_{\gamma} \sum_{i=1}^{N} L(y_i, \gamma)$$

Yet, rather than directly addressing the optimization problem, each $h_m$ can be interpreted as a greedy step within a gradient descent optimization for $F^*$. In this context, every model $h_m$ undergoes training on a distinct dataset $D=\{(x_i, r_{mi})\}_{i=1}^{N}$, where $r_{mi}$ represents the pseudo-residuals, derived as follows:

$$r_{mi} = -\left[\frac{\partial L(y_i, \hat{F}_{m-1}(x_i))}{\partial \hat{F}_{m-1}(x_i)}\right] \hat{F}(x_i) = \hat{F}_{m-1}(x_i)$$

A step size $\beta$ is chosen as the learning rate, and the model can be updated as follows:

$$\hat{F}_m(x) = \hat{F}_{m-1}(x) + \beta h_m(x)$$

where the final model can be derived as follows:

$$\hat{F}(x) = \hat{F}_M(x)$$

Key hyperparameters include the number of boosting stages, the learning rate, controlling the step-size shrinkage, and the maximum depth of the individual trees, which limits the depth. In the model used, 100 boosting stages were applied with a learning rate of 0.1, and the tree depth was limited to three levels.

K-Nearest Neighbor

Figure 9:
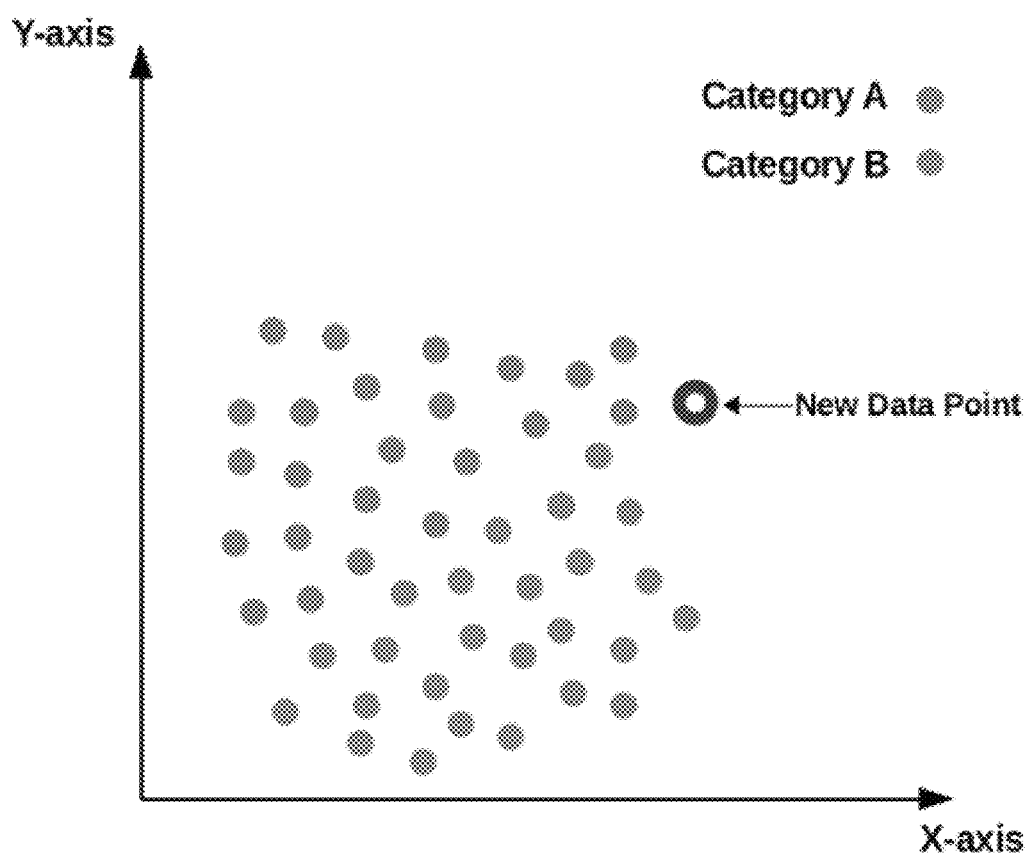
FIG. 9 shows a K-nearest neighbor (KNN) algorithm structure.

Operating as a non-parametric classification algorithm, KNN assigns an unlabeled sample point the class of its nearest neighbor from a set of previously labeled points. This rule operates independently of the joint distribution of sample points and their classifications. Particularly effective for multi-modal classes and scenarios where objects can have multiple labels, it employs a straightforward lazy learning approach, albeit with reduced efficiency. Notably, its performance hinges on the prudent selection of the 'k' parameter, with no principled method available except through computationally expensive techniques such as cross-validation. The algorithm is susceptible to the adverse effects of noise and demonstrates sensitivity to irrelevant features. Further, its performance dynamics vary with dataset size, as it necessitates revisiting all data points. FIG. 9 shows the structure of the KNN algorithm.

The KNN algorithm employs Euclidean distance metrics for locating the nearest neighbor. The Euclidean distance between $x_{query}$ and each $x_i$ in the training set ($D=\{(x_i, y_i)\}_{i=1}^{N}$) is calculated as follows:

$$d_i = \sqrt{\sum_{j=1}^{M}(x_{query,j} - x_{i,j})^2}$$

where M is the number of features. The distances $d_i$ are sorted in ascending order, maintaining the corresponding indices. Then, the first K indices are selected from the sorted list. These indices correspond to the K-nearest neighbors. Finally, the predicted value for the query point ($\hat{y}_{query}$) is calculated as follows:

$$\hat{y}_{query} = \frac{\sum_{i=1}^{K} \frac{1}{d_i} \cdot y_i}{\sum_{i=1}^{K} \frac{1}{d_i}}$$

The primary hyperparameter is the number of neighbors to consider during prediction. In the model used, KNN was configured with five neighbors, influencing the local smoothing of predictions.

Support Vector Regression

Figure 10:
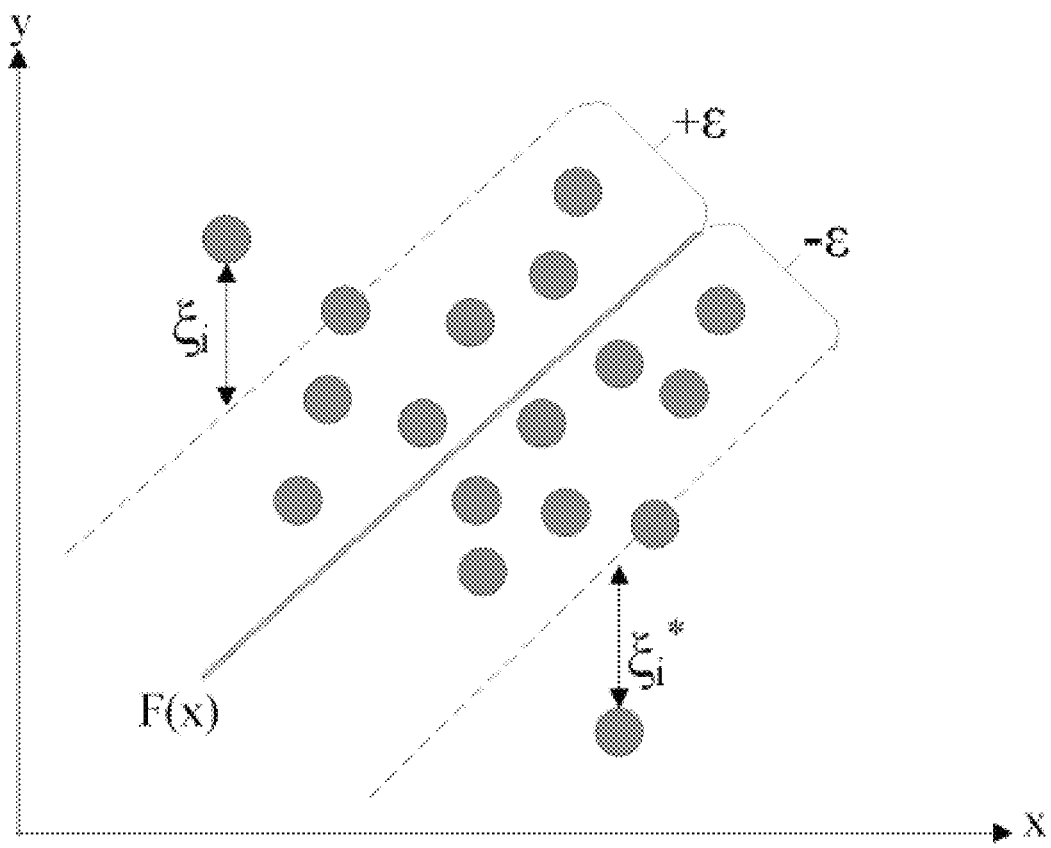
FIG. 10 shows a support vector regression structure.

SVR stands out for its utilization of kernels, sparse solutions, and Vapnik-Chervonenkis (VC) control over the margin and the number of support vectors. While not as widely embraced as support vector machine (SVM), SVR has proven effective in the estimation of real-valued functions. Operating as a supervised learning technique, SVR undergoes training with a symmetrical loss function that uniformly penalizes both high and low estimates. A noteworthy advantage of SVR lies in its computational complexity, which remains unaffected by the dimensionality of the input space. Additionally, SVR demonstrates exceptional generalization capabilities, resulting in high prediction accuracy. FIG. 10 illustrates the structure of the support vector regression algorithm.

Training dataset $D=\{(x_i, y_i)\}_{i=1}^{N}$, where $x_i$ is the input feature vector and $y_i$ is the corresponding output. The objective is to find a regression function by solving the following optimization problem:

$$\min_{w,b,\xi,\xi^*} \frac{1}{2}\|w\|^2 + C\sum_{i=1}^{N}(\xi_i + \xi_i^*)$$

Given the nonlinear kernel function, the nonlinear SVR model is expressed as follows:

$$f(x_i) = -\sum_{i=1}^{N}(\alpha_i - \alpha_i^*)x_i^\top x_i + C\sum_{i=1}^{N}(\alpha_i - \alpha_i^*), \quad \alpha_i - \alpha_i^* \in [0, C]$$

Crucial hyperparameters include the regularization parameter, which determines the regularization strength, and the kernel function, which selects the type of kernel function to be used. In the model used, the regularization parameter was set to 1.0, and the radial basis function kernel was employed.

Neural Networks

Figure 11:
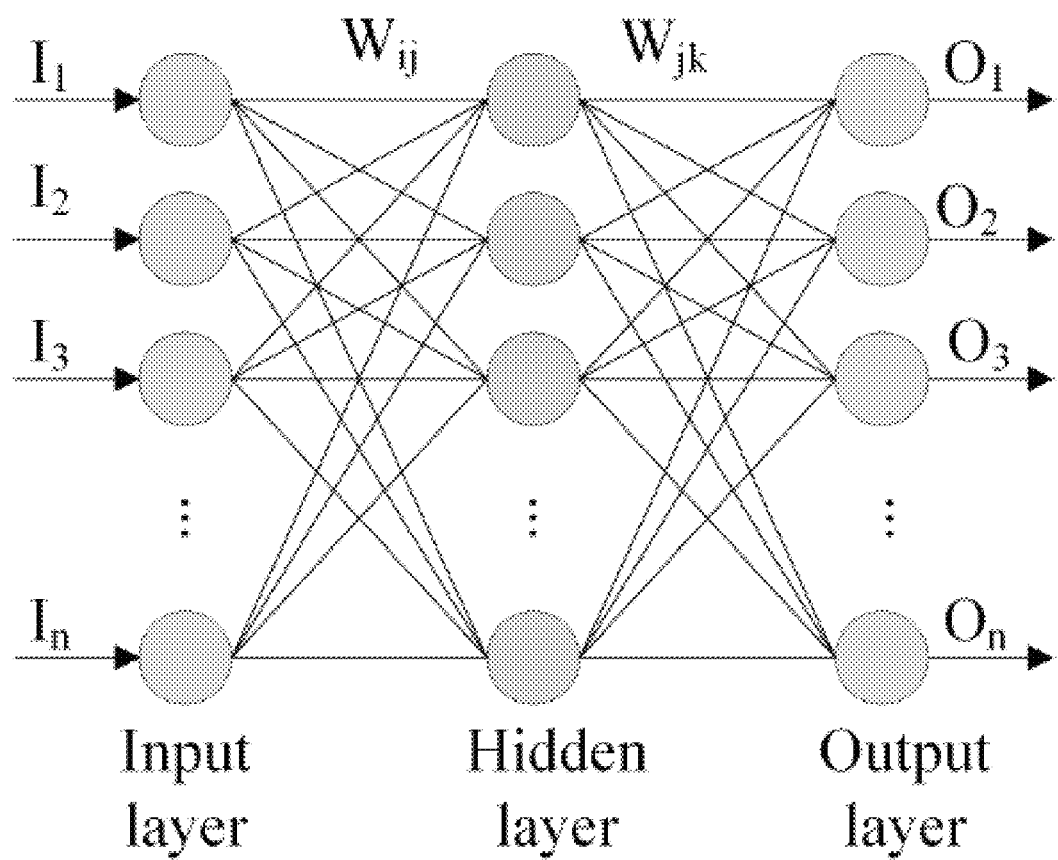
FIG. 11 shows a three-layer backpropagation neural network structure.

Neural networks serve as computational models inspired by the intricacies of the human brain's structure, processing, and learning mechanisms, albeit on a smaller scale. They excel in handling scenarios where relationships are nonlinear or dynamically evolving. Unlike traditional methods with rigid assumptions, such as normality and linearity, neural networks offer a flexible alternative. Their ability to capture a wide range of relationships enables users to model phenomena that might be challenging or impossible to explain using conventional approaches. FIG. 11 shows the structure of a three-layer backpropagation neural network.

The output of the hidden layer can be derived as follows:

$$h_j = \sum_{i=1}^{n} W_{ij} I_i \quad j = 1, 2, \ldots, l$$

The output of the output layer can be calculated as follows:

$$O_k = \sum_{j=1}^{l} h^{k+1}(i) W_{jk} \quad k = 1, 2, \ldots, m$$

Hyperparameters in the sequential model of Keras include the number of units in each dense layer, the number of training epochs, the batch size for optimization, the optimizer algorithm, and the loss function. In the model used, the neural network comprised two hidden layers, each with 10 units and rectified linear unit (ReLU) activation. It was trained for 50 epochs with a batch size of 32, using the 'Adam' optimizer and optimizing for mean squared error.

Bayesian Ridge

Bayesian ridge regression embraces a probabilistic methodology, leveraging the Gaussian probability distribution. The optimization of posterior predictions in Bayesian regression incorporates the use of l2 regularization. This sets Bayesian ridge regression apart, particularly in the derivation of the weighted coefficient 'w,' which is deduced from a spherical Gaussian.

While Bayesian ridge regression demands computational time, it demonstrates notable adaptability concerning small data parameters. Its user-friendly nature is evident in effectively handling regularization challenges and facilitating the tuning of hyperparameters. Despite the computational demands, Bayesian ridge regression proves to be a valuable tool, especially in scenarios with limited data parameters, offering a practical and efficient approach to regularization problem-solving and hyperparameter fine-tuning.

Let observations $y=(y_1, \ldots, y_n)^T \in \mathbb{R}^n$. Define features $X=[1_n, x_1, \ldots, x_m] \in \mathbb{R}^{n \times (m+1)}$, where $x_i$ represents the column vectors in $\mathbb{R}^n$, $i=1, \ldots, m$, and $1_n=(1, \ldots, 1)^T \in \mathbb{R}^n$.

It can be assumed that each $y_i$ has a likelihood, given by:

$$p(y_i \mid \omega, \alpha) = \mathcal{N}\left(y_i \mid \sum_{j=1}^{m} \omega_i X_j, \alpha\right)$$

where $\omega=(\omega_0, \omega_1, \ldots, \omega_m)^T \in \mathbb{R}^m$ represents the weights and $a \in \mathbb{R}$ represents the variance (indicating the noise).

Bayesian ridge regression focuses on determining the "posterior" distribution of the model parameters instead of directly finding these parameters. Consequently, Bayesian ridge regression requires a substantial volume of training data to enhance the accuracy of the model. Key hyperparameters include the values controlling the shape and precision of the distribution of the weights. In the model used, very small values were configured for these hyperparameters, implying weak regularization.

Linear Regression

Linear regression is recognized for its straightforward model structure, representing the regression function as a linear combination of predictors. Its popularity in various applications can be attributed to several factors. The linear form of the model allows for easily interpretable parameters. Further, linear model theories boast well-established mathematical elegance. Additionally, linear regression serves as a foundational element for numerous contemporary modeling tools. Particularly in scenarios where the sample size is limited or the signal strength is modest, linear regression frequently delivers a satisfactory approximation of the underlying regression function.

Consider the dataset $\mathcal{D}$, , denoted as $\{(y_i, x_i): i=1, \ldots, n\}$, where $y_i$ represents the ith response measured on a continuous scale, $x_i$ is the corresponding predictor vector, and $n \gg p$ denotes the sample size. The linear model is formally defined as follows:

$$y_i = \beta_0 + \beta_1 x_{i1} + \ldots + \beta_p x_{ip} + \epsilon_i$$

In the form of a matrix, it can be written:

$$y = X\beta + \epsilon$$

where $y=[yi]n \times 1$ represents the n-dimensional response vector; $X=(x_{ij})_{n \times (p+1)}$, where $x_{i0}=1$ is commonly referred to as the design matrix; and $\epsilon=[\epsilon_i]_{n \times 1}$. Models (1) or (2) involve four primary statistical assumptions, which are as follows:

1. Linearity:

$$\mu \equiv [E(y_i \mid x_i)]_{n \times 1} = X\beta;$$

2. Independence: $\epsilon_i$'s are independent of each other;
3. Homoscedasticity: $\epsilon_i$'s exhibit equal variance $\sigma^2$; and
4. Normality: $\epsilon_i$'s follow a normal distribution.

Many properties of linear models hold true even when all four assumptions are not met. Linear Regression does not have many hyperparameters to tune. It relies on the linear relationship between the features and the target variable.

Embodiments of the subject invention provide a focused technical solution to the focused technical problem of how to efficiently charge a vehicle (e.g., an electric vehicle) during DWC. The solution is provided by using controller to determine the vehicle position in real time (and continuously during wireless charging) using ML and then implementing a control scheme to activate and deactivate appropriate transmitter coils based on the vehicle position, in order to efficiently utilize the transmitter coils during DWC. This plainly has the practical application of significantly improving the efficiency of wireless charging by automatically (without human intervention or interference) controlling a plurality of transmitter coils to optimize efficiency during DWC.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 12:
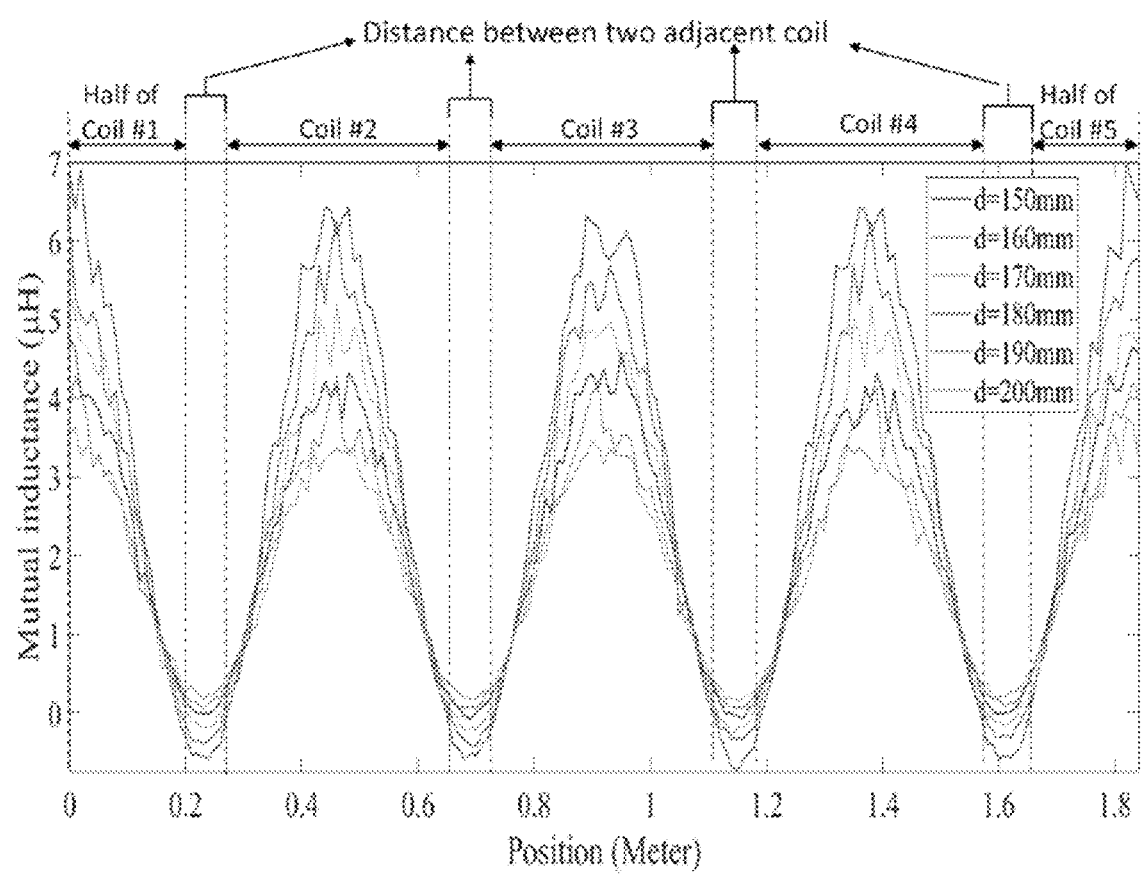
FIG. 12 shows a plot of mutual inductance (in microhenries (μH)) versus position (in meters (m)), showing the mutual inductance between the transmitter coils and receiver with different air gaps at various positions. In the peak for each coil, the curve with the highest mutual inductance is for air gap (d) of 150 millimeters (mm), the curve with the second-highest mutual inductance is for d=160 mm, the curve with the third-highest mutual inductance is for d=170 mm, the curve with the fourth-highest mutual inductance is for d=180 mm, the curve with the fifth-highest mutual inductance is for d=190 mm, and the curve with the lowest mutual inductance is for d=200 mm.

To acquire the necessary data for predicting mutual inductance, the transmitter and receiver coils were simulated in ANSYS Maxwell. This simulation was conducted to obtain mutual inductance data at various positions for different air gaps. Subsequently, the obtained mutual inductance data were utilized in MATLAB R2022b Simulink to capture current data corresponding to different positions at different vehicle speeds. FIG. 12 shows the mutual inductance between the transmitter coils and receiver with different air gaps at various positions. As the receiver moved across the transmitter coils, the mutual inductance reached its maximum when it aligned precisely with each transmitter coil and decreased when the receiver entered the space between adjacent transmitter coils, reaching a minimum at the midpoint between them. This cyclic variation occurred as the receiver crossed each transmitter coil, with the number of cycles corresponding to the number of transmitter coils. With five transmitter coils, five cycles were observed, resulting in five maxima and minima, as shown in FIG. 12. Importantly, due to the similar structure of the transmitter coils, the maximum and minimum values of mutual inductance remained consistent within each cycle.

Figure 13:
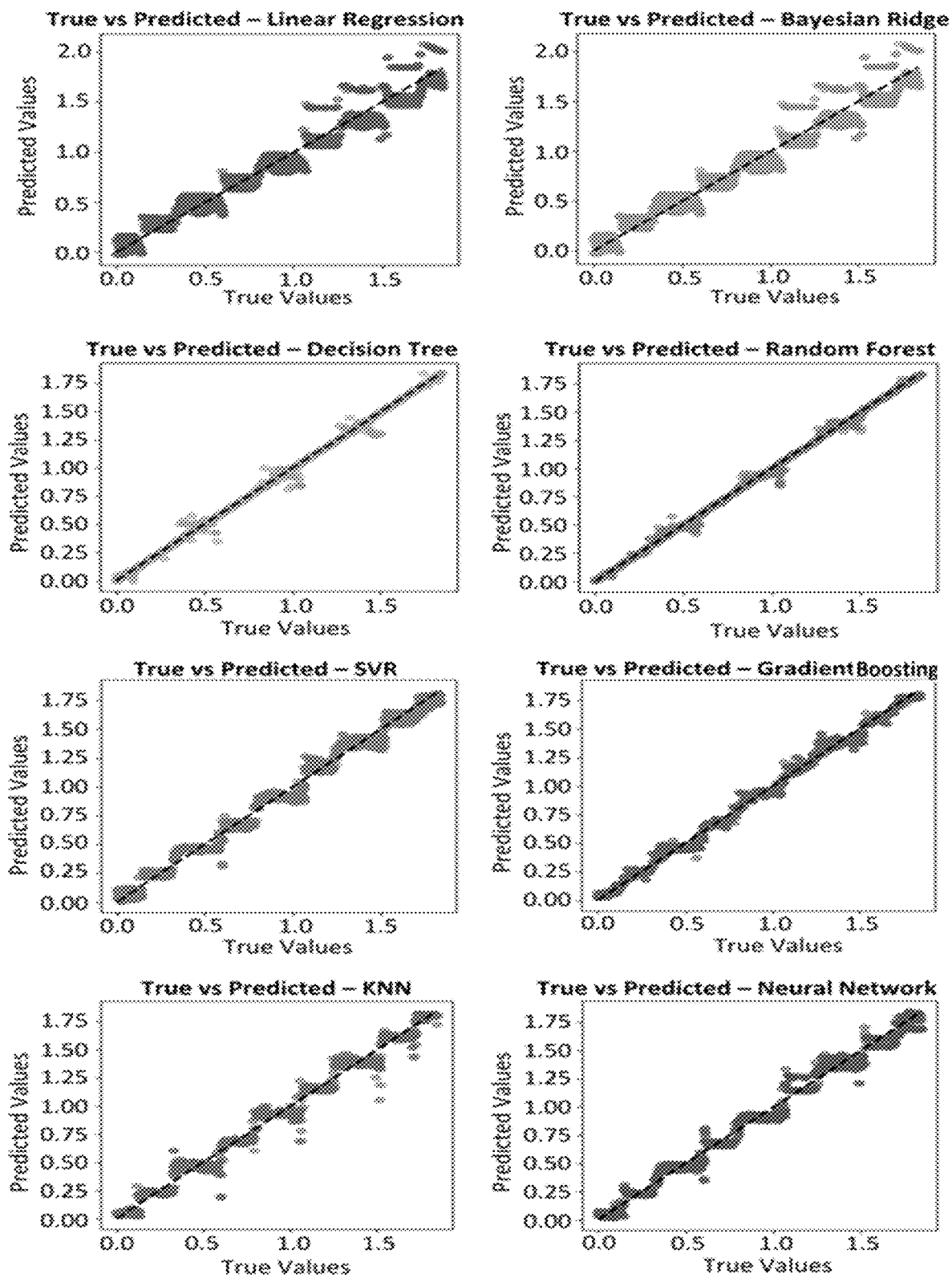
FIG. 13 shows regression plots of eight different ML algorithms in predicting the vehicle's position. Each plot shows predicted values versus true values.

The table in FIG. 20 presents the descriptions and values of the circuit parameters, which were utilized for obtaining the current data in MATLAB Simulink. FIG. 13 shows regression plots illustrating the prediction of the vehicle's position using eight different ML algorithms, namely random forest, decision tree, gradient boosting, KNN, SVR, neural network, Bayesian ridge, and linear regression. The analysis revealed that random forest exhibited superior performance and accuracy in predicting the actual position, followed closely by the decision tree algorithm, which demonstrated better accuracy compared to the other algorithms in predicting the vehicle's position. Further, it can be seen that for each algorithm, the largest errors occurred when estimating the position near the center of each coil. This may be due to the small ΔC in these positions, which can otherwise be a strong identifier of the position depending on whether it is a large positive (increasing mutual inductance) or negative (decreasing mutual inductance) value.

Figure 14:
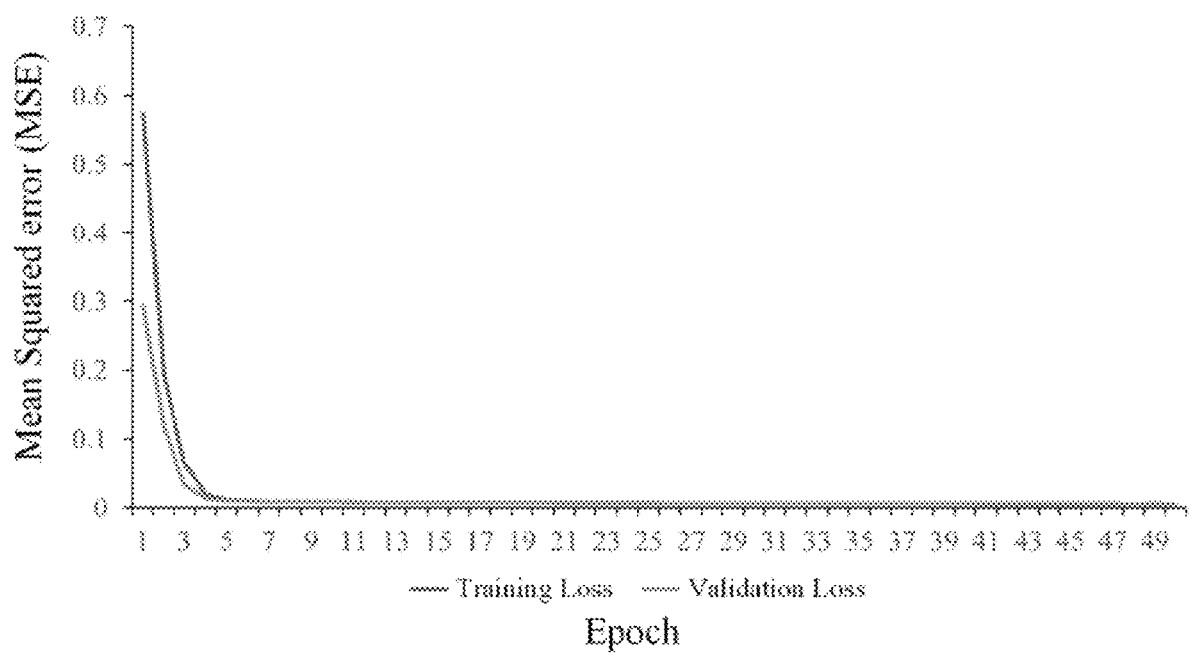
FIG. 14 shows a plot of mean squared error (MSE) versus epoch, showing neural network training per epoch. The curve with an MSE of about 0.58 at epoch 1 is for training loss, and the other curve is for validation loss.

FIG. 14 shows a graph of the neural network training per epoch. This graph shows that the neural network effectively fitted the data within a few epochs (50 epochs in total).

The validation of the training also showed that no overfitting in the neural network occurred. Additionally, although the mean squared error (MSE) settled at around 0.0052, it may be possible to achieve even better generalization (lower MSE) through appropriate tuning and optimization of the hyperparameters and architecture using various methods (see also, Abdolrasol et al., A. Artificial Neural Networks Based Optimization Techniques: A Review, Electronics 2021, 10, 2689; which is hereby incorporated by reference herein in its entirety).

Figure 15:
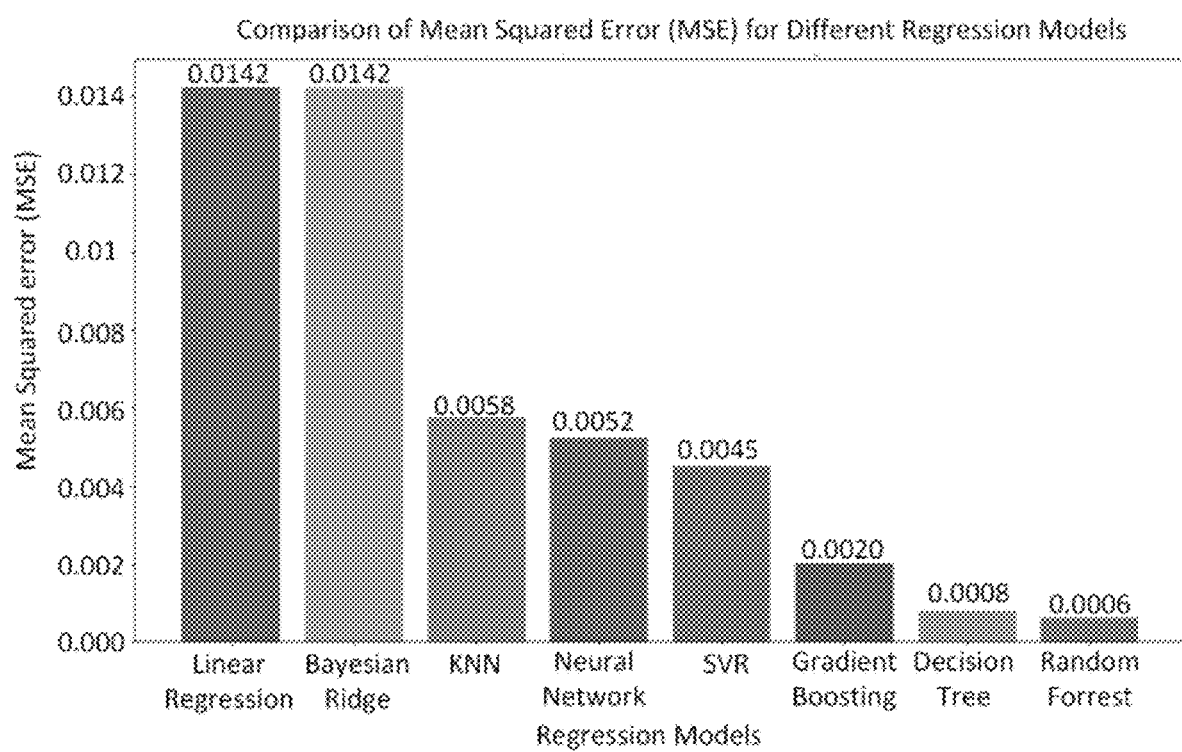
FIG. 15 shows a bar chart of the MSE for different ML algorithms employed for predicting the vehicle's position.

In FIG. 15, the MSE is illustrated for the different ML algorithms employed for predicting the vehicle's position. The random forest algorithm exhibited the lowest MSE, followed closely by the decision tree algorithm, which exhibited a lower MSE compared to the other ML algorithms. The random forest algorithm's superior performance may be due to the fact that it acts as a preventative measure against overfitting and yields more accurate predictions. Moreover, the random forest algorithm introduces extra randomness during tree growth. Instead of solely focusing on the most crucial feature during node splitting, it explores the best feature within a random subset of features. This approach fosters broad diversity, typically leading to superior model performance.

Figure 16:
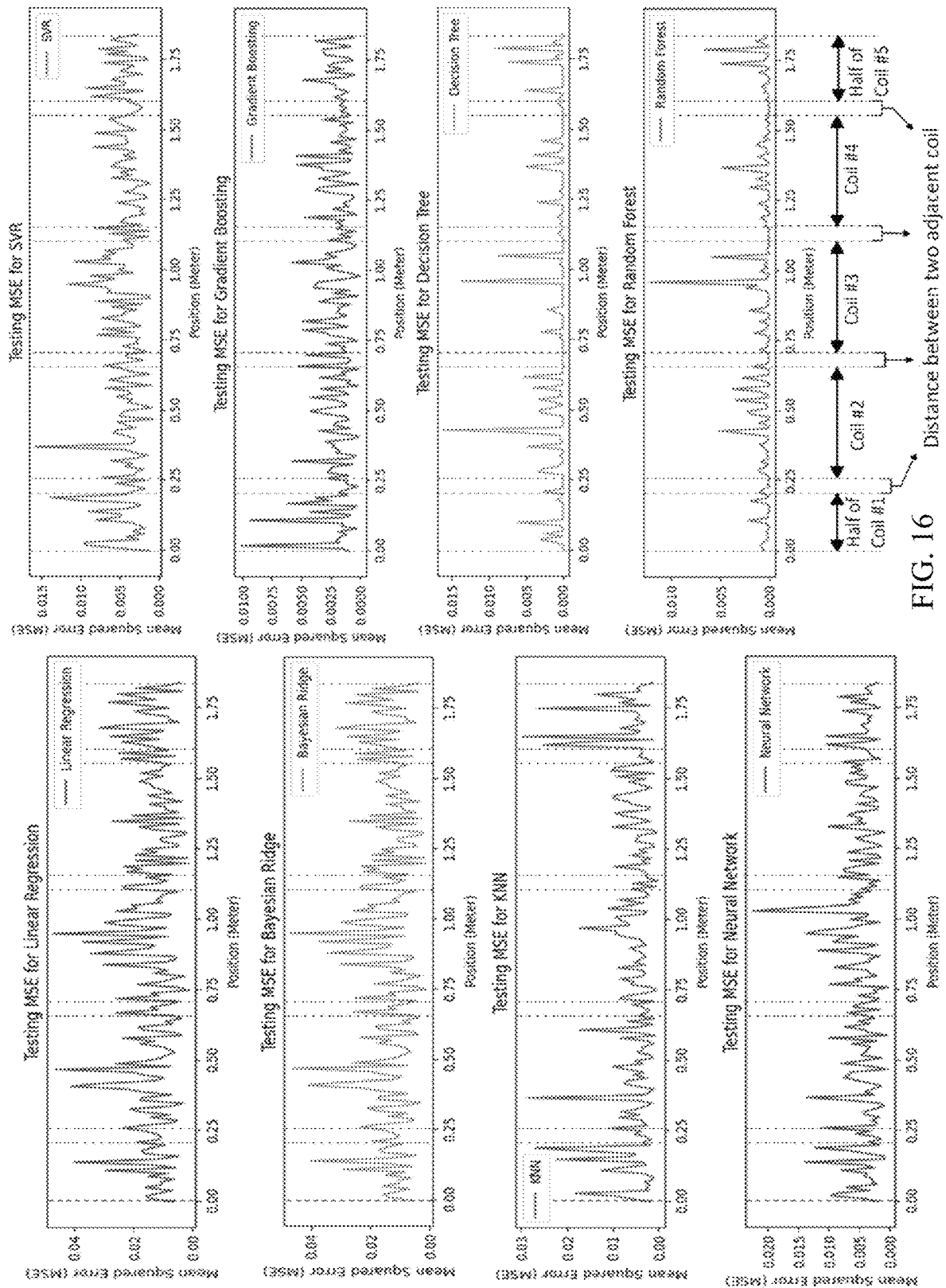
FIG. 16 shows the errors of eight different ML algorithms employed for predicting the vehicle's position at different positions. Each plot is MSE versus position (in m).

FIG. 16 illustrates the errors of various ML algorithms at different positions. These findings highlight the superior performance of the random forest algorithm, which consistently exhibited the lowest error across different positions, followed by the decision tree algorithm, which demonstrated excellent performance and consistently exhibited very low errors in predicting the vehicle's position.

Figure 17:
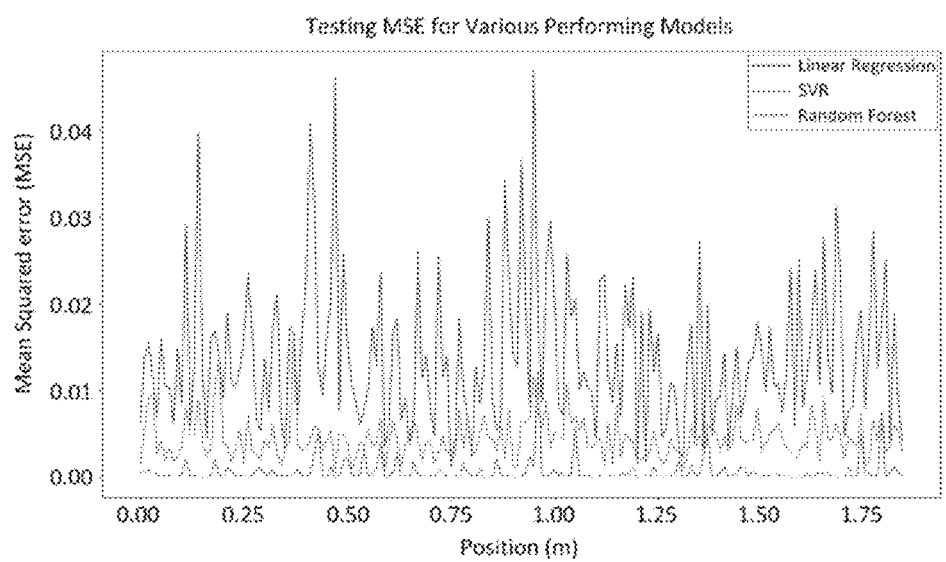
FIG. 17 shows a plot of MSE versus position (in m), showing the errors per position of three ML algorithms displayed in a single graph. The curve with the highest MSE at a position of 1.00 m is for linear regression; the curve with the second-highest MSE at a position of 1.00 m is for SVR; and the curve with the lowest MSE at a position of 1.00 m is for random forest.

Random forest, neural network, and SVR were chosen for further comparison. Their errors per position are displayed in a single graph, shown in FIG. 17. The graph illustrates the superiority of the random forest algorithm in predicting the vehicle's position with the lowest error.

Accurate detection of a vehicle's position is important for DWC of electric vehicles, ensuring efficient and safe operation. Related art methods relying on sampling transmitters' currents become ineffective due to the high speed of vehicles in DWC systems. Embodiments of the subject invention utilize ML algorithms for predicting the vehicle's position, leveraging their self-learning capability, adaptability to the environment, and swift response. Eight distinct ML algorithms were employed for vehicle position detection. MSE bar graphs for each of the eight ML algorithms and regression plots for each algorithm demonstrated their accuracy in predicting the actual position.

Based on the comparison, the 'tree'-based methods, (decision tree and random forest) demonstrated better generalization with the provided dataset. The results underscore the superiority of the random forest algorithm in accurately predicting the actual position.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for detecting position of a vehicle during wireless charging, the system comprising:
   at least two transmitter coils configured to perform wireless charging with a receiver coil;
   at least one first sensor configured to sense a ground clearance of the vehicle during wireless charging;
   at least one second sensor configured to sense a speed of the vehicle during wireless charging; and
   a controller in operable communication with the at least two transmitter coils, the at least one first sensor, and the at least one second sensor,
   the controller being configured to perform the following steps during wireless charging:
   i) receive, from the at least two transmitter coils during wireless charging, a primary current of the at least two transmitter coils;
   ii) receive, from the at least one first sensor during wireless charging, a measurement of the ground clearance of the vehicle;
   iii) receive, from the at least one second sensor during wireless charging, a measurement of the speed of the vehicle;
   iv) utilize a machine learning algorithm to determine a position of the vehicle in real time based on the primary current of the at least two transmitter coils, the ground clearance of the vehicle, and the speed of the vehicle; and
   v) implement a control strategy to control the at least two transmitter coils based on the position of the vehicle.

2. The system according to claim 1, the control strategy comprising controlling respective switches of the at least two transmitter coils to ensure a transmitter coil of the at least two transmitter coils that is closest to the receiver coil is activated and all other transmitter coils of the at least two transmitter coils are deactivated.

3. The system according to claim 1, the controller being configured to further perform the following step during wireless charging:

vi) repeat steps i)-v) until the controller determines that the receiver coil is no longer within range to be wirelessly charged by any transmitter coil of the at least two transmitter coils.

4. The system according to claim 1, the machine learning algorithm using only the primary current of the at least two transmitter coils, the ground clearance of the vehicle, and the speed of the vehicle as inputs, and generating the position of the vehicle as output.

5. The system according to claim 1, the machine learning algorithm being random forest, decision tree, gradient boosting, K-nearest neighbor (KNN), support vector regression (SVR), neural network, Bayesian ridge, or linear regression.

6. The system according to claim 1, the machine learning algorithm being random forest or decision tree.

7. The system according to claim 1, the machine learning algorithm being random forest.

8. The system according to claim 1, the at least two transmitter coils comprising five transmitter coils.

9. The system according to claim 1, the at least two transmitter coils being directly connected to at least two compensation networks, respectively.

10. The system according to claim 9, the at least two compensation networks being directly connected to at least two inverters, respectively.

11. A method for detecting position of a vehicle during wireless charging, the method comprising:
   i) providing at least two transmitter coils configured to perform wireless charging with a receiver coil, at least one first sensor configured to sense a ground clearance of the vehicle during wireless charging, and at least one second sensor configured to sense a speed of the vehicle during wireless charging;
   ii) performing wireless charging of the vehicle using the at least two transmitter coils;
   iii) receiving, by a controller, from the at least two transmitter coils during wireless charging, a primary current of the at least two transmitter coils;
   iv) receiving, by the controller, from the at least one first sensor during wireless charging, a measurement of the ground clearance of the vehicle;
   v) receiving, by the controller, from the at least one second sensor during wireless charging, a measurement of the speed of the vehicle;
   vi) utilizing, by the controller, a machine learning algorithm to determine a position of the vehicle in real time based on the primary current of the at least two transmitter coils, the ground clearance of the vehicle, and the speed of the vehicle; and
   vii) implementing, by the controller, a control strategy to control the at least two transmitter coils based on the position of the vehicle.

12. The method according to claim 11, the control strategy comprising controlling respective switches of the at least two transmitter coils to ensure a transmitter coil of the at least two transmitter coils that is closest to the receiver coil is activated and all other transmitter coils of the at least two transmitter coils are deactivated.

13. The method according to claim 11, further comprising:
   viii) repeating steps iii)-vii), by the controller, until the controller determines that the receiver coil is no longer within range to be wirelessly charged by any transmitter coil of the at least two transmitter coils.

14. The method according to claim 11, the machine learning algorithm using only the primary current of the at least two transmitter coils, the ground clearance of the vehicle, and the speed of the vehicle as inputs, and generating the position of the vehicle as output.

15. The method according to claim 11, the machine learning algorithm being random forest, decision tree, gradient boosting, K-nearest neighbor (KNN), support vector regression (SVR), neural network, Bayesian ridge, or linear regression.

16. The method according to claim 11, the machine learning algorithm being random forest or decision tree.

17. The method according to claim 11, the machine learning algorithm being random forest.

18. The method according to claim 11, the at least two transmitter coils comprising five transmitter coils.

19. The method according to claim 11, the at least two transmitter coils being directly connected to at least two compensation networks, respectively, and
   the at least two compensation networks being directly connected to at least two inverters, respectively.

20. A system for detecting position of a vehicle during wireless charging, the system comprising:
   at least two transmitter coils configured to perform wireless charging with a receiver coil;
   at least one first sensor configured to sense a ground clearance of the vehicle during wireless charging;
   at least one second sensor configured to sense a speed of the vehicle during wireless charging; and
   a controller in operable communication with the at least two transmitter coils, the at least one first sensor, and the at least one second sensor,
   the controller being configured to perform the following steps during wireless charging:
      i) receive, from the at least two transmitter coils during wireless charging, a primary current of the at least two transmitter coils;
      ii) receive, from the at least one first sensor during wireless charging, a measurement of the ground clearance of the vehicle;
      iii) receive, from the at least one second sensor during wireless charging, a measurement of the speed of the vehicle;
      iv) utilize a machine learning algorithm to determine a position of the vehicle in real time based on the primary current of the at least two transmitter coils, the ground clearance of the vehicle, and the speed of the vehicle; and
      v) implement a control strategy to control the at least two transmitter coils based on the position of the vehicle; and
      vi) repeat steps i)-v) until the controller determines that the receiver coil is no longer within range to be wirelessly charged by any transmitter coil of the at least two transmitter coils,
   the control strategy comprising controlling respective switches of the at least two transmitter coils to ensure a transmitter coil of the at least two transmitter coils that is closest to the receiver coil is activated and all other transmitter coils of the at least two transmitter coils are deactivated,
   the machine learning algorithm using only the primary current of the at least two transmitter coils, the ground clearance of the vehicle, and the speed of the vehicle as inputs, and generating the position of the vehicle as output,
   the machine learning algorithm being random forest,
   the at least two transmitter coils being directly connected to at least two compensation networks, respectively, and the at least two compensation networks being directly connected to at least two inverters, respectively.

\* \* \* \* \*